Dec. 20, 1938.　　　　A. JAMES　　　　2,140,911

SELF-CLEARING HOE

Filed Feb. 28, 1938

Arthur James
INVENTOR

BY W. B. Harpman
ATTORNEY

Patented Dec. 20, 1938

2,140,911

UNITED STATES PATENT OFFICE 2,140,911

SELF-CLEARING HOE

Arthur James, Youngstown, Ohio

Application February 28, 1938, Serial No. 193,059

2 Claims. (Cl. 55—146)

This invention relates to a hoe and more particularly to a hoe designed for weeding.

The principal object of this invention is the provision of a hoe designed for weeding and provided with a plurality of wedge shaped openings, each one of which is adapted to engage the stem of a weed in such a manner that the weed becomes wedged therein.

A further object of this invention is the provision of a clearing bar positioned in a slidable manner over the said wedged shaped openings of the hoe, and adapted to clear the weeds from the wedged shaped openings.

A still further object of this invention is the provision of a hoe, adapted for weeding, and having a clearing bar positioned thereon, under spring tension in such manner that when the hoe is lifted from the ground the spring tension will cause the clearing bar to clear the weeds from the jaws of the hoe.

A still further object of this invention is the provision of a weeding hoe having a self clearing device formed thereon, the clearing device being adapted to be raised from the weeding jaws of the hoe when the hoe is placed in the ground, by means of a pair of support members formed on the clearing bar and adapted to rest on the surface of the ground when the hoe is used.

The weeding hoe shown and described herein has been designed for use in weeding and has been provided with a plurality of jaws or wedge-like openings in the cutting edge thereof, each of which is adapted to wedge around the stem of a weed and hold it while it is drawn from the ground.

In order that the various jaws or wedge-like openings may be easily cleared, a self operating clearing device has been incorporated and comprises a bar slidably positioned over the jaws or wedge-like openings and normally held in a clearing position by means of a spring.

In order that the clearing bar be held up away from the wedge-like openings when the hoe is being used, a pair of projecting brackets have been formed on the clearing bar and are adapted to contact the surface of the ground and raise the bar above the wedge-like openings when the hoe is placed in the ground. It is obvious that when the hoe is raised from the ground and there are a number of weeds caught in the wedge-like openings the spring will force the clearing bar down across the wedge-like openings and clear the weeds from them.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention is illustrated in the accompanying drawing, wherein:—

Figure 1:
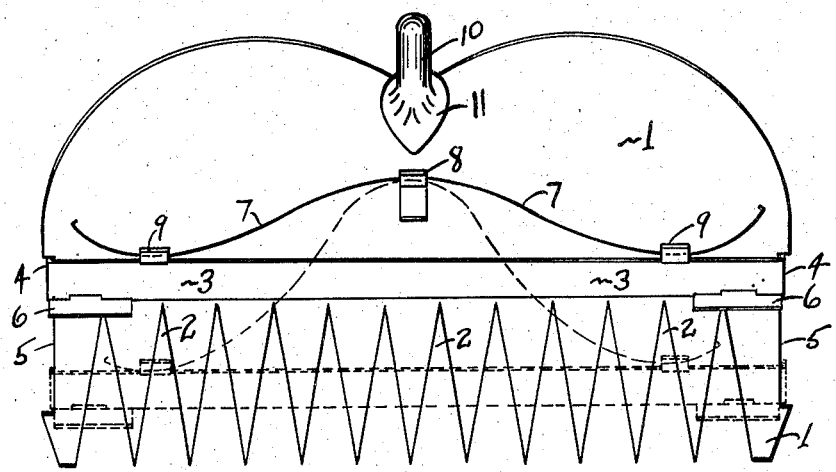
Figure 1 is a front elevation of the weeding hoe showing the clearing bar in a raised position.
Figure 2:
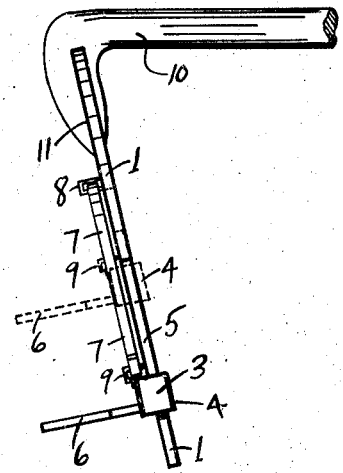
Figure 2 is a side elevation of the weeding hoe showing the clearing bar in a lowered or clearing position.

By referring to the drawing it will be seen that the hoe 1 having a plurality of wedge-like openings 2 formed in the cutting edge thereof, has been provided with a clearing bar 3. This clearing bar 3 is slidably positioned on the front of the hoe 1 and has inturned ends 4 bent around the hoe in order to maintain it thereon. In order that the clearing bar be limited as to the degree of movement, channels 5 have been formed in the sides of the hoe 1 and the clearing bar 3 positioned therein. Formed on this clearing bar 3 and preferably as a portion thereof, there are a pair of projecting brackets 6 which are designed to contact the surface of the ground and raise the clearing bar on the hoe in relation to the wedge-like openings therein when the hoe is positioned in the ground. In order that the clearing bar 3 will clear weeds from the wedge-like openings 2 when the hoe is removed from the ground a spring 7 has been provided and is attached to the hoe by means of a bracket 8 stamped from a portion of the hoe 1. The opposite ends of the spring 7 are slidably maintained on the upper surface of the bar 4 by means of brackets 9 formed thereon. In Figure 1 the clearing bar 3 is shown in solid lines in the position it would be in when the hoe is placed in the ground, and in dotted lines in the position it would be in when the hoe is raised from the ground and the spring 7 has forced it downwardly across the wedge-like openings 2. In Figure 2 the positions of the clearing bar have been reversed, the solid lines showing the clearing bar in the clearing position and the dotted lines showing it in the position it would be in when the hoe is in the ground.

A handle 10 is affixed to the hoe 1 at a point 11 and preferably at a slight angle thereto, so that the projecting brackets 6 will contact the surface of the ground immediately upon the insertion of the hoe thereinto.

What I claim is:—

1. In a weeding hoe comprising a hoe blade having a handle attached thereto, a plurality of jaws formed in the cutting edge of the hoe blade and adapted to grip the stems of weeds, a clearing bar slidably positioned over the jaws and adapted to clear weeds therefrom, channels formed in the said hoe blade and adapted to receive the said clearing bar and limit its movement thereon, projecting brackets formed on the said clearing bar and adapted to contact the ground and raise the said clearing bar when the hoe blade is placed therein.

2. In a weeding hoe comprising a hoe blade having a handle attached thereto, a plurality of wedge-like openings formed in the cutting edge thereof, channels formed in the sides of the said cutting blade and adapted to receive and position a clearing bar in a slidable manner across the plurality of wedge-like openings, a bracket formed on the hoe blade, a pair of projecting brackets formed on the said clearing bar and slidably engaging a spring, the said spring opposing the bracket formed on the hoe blade.

ARTHUR JAMES.